United States Patent [19]

Bigot

[11] Patent Number: 4,524,057

[45] Date of Patent: Jun. 18, 1985

[54] PRODUCTION OF CONCENTRATED PHOSPHORIC ACID AND HEMIHYDRATED CALCIUM SULFATE

[75] Inventor: Bernard Bigot, La Londe, France

[73] Assignee: Rhone-Poulenc Industries, Paris, France

[21] Appl. No.: 600,154

[22] Filed: Apr. 13, 1984

Related U.S. Application Data

[63] Continuation of Ser. No. 371,943, Apr. 26, 1984, abandoned, which is a continuation of Ser. No. 961,282, Nov. 16, 1978, abandoned.

[30] Foreign Application Priority Data

Nov. 16, 1977 [FR] France ............................. 77 34395

[51] Int. Cl.$^3$ ............................................. C01B 25/16
[52] U.S. Cl. ................................... 423/555; 423/166; 423/167; 423/320
[58] Field of Search ................ 423/166, 167, 320, 555

[56] References Cited

U.S. PATENT DOCUMENTS 3,632,307  1/1972  Van Es ............................... 423/320

Primary Examiner—Gregory A. Heller
Assistant Examiner—Wayne A. Langel
Attorney, Agent, or Firm—Burns, Doane, Swecker & Mathis

[57] ABSTRACT

Concentrated phosphoric acid and calcium sulfate hemihydrate are directly produced by sulfuric acid attack upon calcium phosphate, the improvements comprising (i) continuously conducting the acid attack reaction, with concomitant formation of crystalline calcium sulfate hemihydrate, in but a single, homogeneous liquid reaction medium comprising the products of reaction, (ii) maintaining constant the temperature of the reaction medium as to effect formation of hemihydrated calcium sulfate, (iii) controlling the amount of reactants introduced to the reaction medium such as to maintain essentially constant, in liquid phase, a determined sulfate ion content, said content being at least 5 g/l and said determined content increasing with decreasing concentrations of $P_2O_5$ at a given temperature, and (iv) withdrawing a fraction of reaction effluent, including the concentrated phosphoric acid, and individually separating and recovering hemihydrated calcium sulfate from said reaction effluent fraction. Advantageously, the hemihydrate is recrystallized into a marketable gypsum by means of a treatment liquid which is subsequently recycled, preferably first to wash the hemihydrate and thence for purposes of the phosphate attack.

21 Claims, No Drawings

PRODUCTION OF CONCENTRATED PHOSPHORIC ACID AND HEMIHYDRATED CALCIUM SULFATE

This application is a continuation of application Ser. No. 371,943, filed Apr. 26, 1984 which is a continuation of application Ser. No. 961,282, filed Nov. 16, 1978 both abandoned.

BACKGROUND OF THE INVENTION

1. Field of the Invention

The present invention relates to the production of wet process phosphoric acid from calcium phosphate and sulfuric acid, and, more especially, relates to that process in which, by means of an acid attack upon calcium phosphate, calcium sulfate is formed in the form of its hemihydrate, $CaSO_4 \cdot \frac{1}{2} H_2O$.

2. Description of the Prior Art

It is known to the art that by means of an acid attack process high concentrations of acid, on the order of 40–55% $P_2O_5$ by weight, may be directly attained, while at the same time eliminating the distinct operation of concentration by evaporation.

The reaction leading to the formation of the hemihydrate:

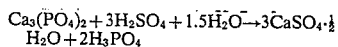

has been studied, especially by Nordengren, e.g., U.S. Pat. No. 1,776,593 (1930), then by Dahlgren, see Chapter 2, Volume I of A. V. Slack, *Phosphoric Acid*, Dekker, N.Y. (1968). An industrial process is described in U.S. Pat. No. 19,045 by Larsson, or French Pat. No. 709,848; however, the difficulties militating against successful operation are numerous; same are dur particularly to poor yields of the attack reaction in the presence of unreacted $P_2O_5$, with the tendency of blocking the reaction through the deposition of calcium sulfate on the granular phosphate; also, the presence of $P_2O_5$ rendered insoluble in the form of dicalcium phosphate co-crystallized with calcium sulfate; problems of filtration and washing in the concentrated medium too have been reported, in French Pat. No. 709,848 (1931).

Inherent difficulties in reaction yields also exist when the phosphate is treated under conditions giving rise to gypsum formation and solutions have been determined to exist, particularly in relation to the conditions of the reaction with respect to temperatures and concentrations, which result in satisfactory continuous operations. Equipment has also been proposed providing good conditions for the crystallization of gypsum on an industrial scale.

However, such difficulties exist on an even larger scale in the range theoretically leading to the hemihydrate. Further, in the hemihydrate range, the high concentration of the acid to be separated and, consequently, its high viscosity, together with the slight amount of water admitted to the reaction, represent unfavorable conditions for satisfactory crystallization and good washing. The difficulties of filtering and washing due to mediocre crystallization are such that a number of industrial processes are bottomed on an imperfect separation of the hemidrate, or eliminate washing or even the separation itself; this is the case with those processes illustrated in the U.S. Pat. No. 3,505,013. However, filtration and intensive washing are important. To these problems of filtration due to the poor crystallization of the hemihydrate and the viscosity of the acid, is added the problem of corrosion resulting from the elevated temperatures employed.

On the other hand, the hemihydrate is stable within narrow limits only; consequently, upon a slight drop in temperature, for example, the hemihydrate tends to be converted or transformed into gypsum, resulting in the phenomena of solidification and scaling.

In attempting to eliminate these difficulties and obtain good crystallization of the hemihydrate, most of the methods known at the present time are predicated upon performing the phosphate reaction progressively, in several successive stages, as per Larsson in 1931 in French Pat. No. 709,846; a preliminary attack by dilute phosphoric acid is described in U.S. Pat. Nos. 3,552,918, 3,653,826 and 3,418,077, British Pat. No. 1,250,191; a fractioning of the sulfuric acid supply is described in South African Patent No. 68/0570.

It is generally recognized that satisfactory crystallization may be obtained when hemihydrate crystals are formed initially in a medium having a $SO_4^{--}$ content less than stoichiometric, particularly in a medium containing intermediate reaction products, such as monocalcium phosphate; the first reaction medium obtained is then transferred to a subsequent reaction zone, where the $SO_4^{--}$ content is raised to stoichiometry or beyond, causing the precipitation of all of the calcium in the form of hemihydrated calcium.

In all of these processes, the growing crystals are thus placed in or exposed to the presence of successively differing conditions of concentration and temperature.

SUMMARY OF THE INVENTION

It has now been determined that, in contrast to the known processes, and which is a major object of the present invention, well crystallized hemihydrate may be obtained, said hemihydrate being suitable for separation and washing when the crystal formation is complete, in but a single reaction medium.

Another object of the invention is to circumscribe those conditions or characteristics of the calcium phosphate reaction medium in which hemihydrate calcium sulfate may be formed that is both stable and well crystallized, making possible ultimate filtration and washing.

Briefly according to the invention, the operation preferably is continuous, and the calcium phosphate reaction and the formation of the hemihydrate crystals takes place in a homogeneous reaction medium comprising the products resulting from the completion of the reaction, specifically, the resultant concentrated phosphoric acid; the temperature of the reaction medium is maintained constant at a value effecting the formation of hemihydrated calcium sulfate at selected concentrations; the introduction of the initial starting materials is controlled so as to maintain a content of $SO_4^{--}$ ions in the liquid phase which is constant and equal at least to 5 g/l; and the flow of the reaction medium is then terminated and separation thereof effected with the separate recovery of the desired strong phosphoric acid and the calcium sulfate hemihydrate.

Advantageously, following the separation of the calcium sulfate hemihydrate, same is washed with water and the wash water recycled to the phosphate reaction medium.

DETAILED DESCRIPTION OF THE INVENTION

Typically, a content of $SO_4^{--}$ ions in the liquid phase of 5 g/l to 20 g/l is selected; said selected amount varying conversely with the $P_2O_5$ concentration for a given temperature.

The temperature of the reaction medium is maintained at a value selected between 80° and 100° C. for a $P_2O_5$ concentration between 55% and 40% by weight in the liquid phase.

A phosphoric acid having a concentration of from approximately 40 to 55% by weight in the liquid phase, and a reaction yield on the order of 97%, is obtained, together with well crystallized hemihydrate.

It has been found that the reaction of attacking the calcium phosphate is rapid and gives rise to crystals consisting entirely of the hemihydrate. This characteristic, which facilitates ultimate filtration and washing, may be attributed to the reaction in the presence of a large quantity of hemihydrate crystals already formed, which crystals play the role of crystallization nuclei. In fact, when conducting the reaction within the limits described hereinabove, no calcium sulfate crystals will be found to have a different degree of hydration and, in particular, no gypsum crystals will be found. It was also surprisingly found that the hemihydrate crystallization takes place at temperatures less elevated than those which are generally known as the temperatures of the formation of a stable hemihydrate. In particular, hemihydrate formation in the process of the invention takes place at temperatures lower by approximately 10° C. than those necessary in the processes in which a pre-attack with sulfuric acid deficiency is employed, as will hereinafter be seen in the examples.

A constant proportion of solids is maintained in the reaction vessel, generally comprised between 25 and 50% by weight. The separation of the solids may be effected by any known means; filtration often being preferred. Although it is possible to generally filter at the temperature of attack, it has been found to be advantageous to cool the hemihydrate sludge or slurry prior to filtration in order to limit the risk of corrosion.

The solids may also be washed on the filter methodically, the last wash being by water; each liquid is recycled to the filter and is finally returned to the attack reaction medium.

The products recovered are the hemihydrate on the one hand, and the concentrated sulfuric acid on the other, the latter containing but little fluorine and little sulfuric acid.

According to one embodiment of the process of the invention, it was found to be advantageous to transfer the separated hemihydrate, optionally after a methodical wash, to a second stage of the process where the hemihydrate is rehydrated to gypsum by any known means.

Preferably, the hemihydrate is continuously transferred to an agitated zone in the presence of a reaction medium containing the products of the rehydration, gypsum and a phosphoric acid solution, a temperature effecting hydration to gypsum being maintained at all points, and sulfuric acid is introduced; following a retention time such that the recrystallization is completed, and the gypsum is then separated, collected, and the liquid returned to the process starting point, preferably first to wash the hemihydrate, then to attack the phosphate.

In the zone of rehydration a constant temperature of between 40° and 100° C., preferably between 50° and 80° C., is maintained; in the liquid phase a constant $SO_4^{--}$ ion content comprised between 50 g/l and 300 g/l, preferably on the order of 100 g/l, is maintained; the concentration of $P_2O_5$ in the liquid phase is less than 25%, and preferably less than 10%.

The gypsum separated is subjected to a systematic water wash, the most heavily concentrated liquid is returned for washing of the hemihydrate, the intermediate liquid to the zone of rehydration and the least concentrated liquid to the initial gypsum wash.

It has been found that the rehydration stage improves the overall yield in $P_2O_5$. In actual fact, in this stage the $P_2O_5$ co-crystallized with the hemihydrate is liberated and the proportion of co-crystallized $P_2O_5$ which may be formed with the gypsum is limited due to the medium which is low in $P_2O_5$ and high in $H_2SO_4$, the major part of the unreacted $P_2O_5$ being redissolved and means providing for the return of the liquid phase to the starting point in the process improves the total yield of $P_2O_5$, which may attain and even exceed 99%. The sulfuric acid utilized in the rehydration stage is recovered and used for the attack reaction.

Generally, retention times comprised between one hour and eight hours, preferably three to four hours, are employed as regards the medium acting upon the hemihydrate, and 30 minutes to 6 hours, preferably 1 to 2 hours, in the reactor for the recrystallization to gypsum.

The process may be conducted in any known type of apparatus capable of providing the conditions described herein. Advantageously, for the phosphate attack reaction and also possibly for the rehydration, a non-compartmented agitated vessel, such as that described in U.S. Pat. No. 2,950,171 and equipped with cooling and cleaning means, known in and at itself, is selected, and preferably there is utilized the device described in French Pat. No. 2,263,811. The sludge is cooled, preferably by evaporation, and optionally under vacuum. Liquid-solid separations are effected by any type of known equipment, such as decanters, centrifugal dryer, filter and preferably the horizontal plane vacuum filter described in U.S. Pat. No. 3,262,574 which enables systematic washing and good separation of the various filtrates.

The process makes it possible to obtain phosphoric acid in high concentration and excellent yields from both the attack reaction and after washing. The overall yield may attain and even exceed 99%.

The phosphate attack reaction takes place at moderate temperatures which represents an advantage in view of the diminished risk of corrosion of the equipment and of the formation of anhydride. The hemihydrate is stable enough to be filtered, dried and washed, without significant hydration, which occurs only after a period of time much larger than that required for filtration.

The process supplemented by rehydration provides and even higher yield and a gypsum free of impurities, particularly phosphoric impurities, which enables marketing of the gypsum thins produced.

In order to further illustrate the present invention and the advantages thereof, the following specific examples are given, it being understood that same are intended only as illustrative and in nowise limitative.

EXAMPLE 1

In an agitated, non-compartmented vessel having a capacity of 120 m³, 12 tons of Togo phosphate were continuously introduced per hour, the phosphate containing 36.8% $P_2O_5$ and being in ground state, together with 11 tons of sulfuric acid (92.5% $H_2SO_4$) and 22 tons of 32-35% phosphoric acid, recycled from the filter and premixed with the sulfuric acid. The slurry was maintained at 95° C., was continuously removed, cooled to 60° C. and filtered on a continuous filter under vacuum, including three systematic washing stages.

Phosphoric acid was produced at a rate of 9.5 tons per hour, the acid titrating 45% $P_2O_5$ and 0.8% $H_2SO_4$, amounting to 12 g/l.

The yield from the phosphate attack reaction was 97%, the insoluble material consisting of 1.3% $P_2O_5$, co-crystallized, and 1.2% unreacted. The yield upon washing was on the order of 99.5%.

EXAMPLE 2

The following experiments were conducted to determine the temperature of the medium of the attack reaction:

[a] In a continuous operation, in the final stage of the invention, the initial medium was a slurry containing all of the calcium sulfate in the form of gypsum, 100%, and a liquid phase in which the phosphoric acid concentration was 40% $P_2O_5$ and also containing 25 g/l sulfuric acid. The temperature of 73° C. was gradually raised in intervals of 5° C. Hemihydrate formation in this medium did not take place until the temperature exceeded 100° C., while the attack reaction occurred between 80° and 100° C. according to the invention.

If this same slurry, with 100% hemihydrate present, was cooled in intervals of 5° C., the formation of gypsum did not begin until the temperature was decreased below 90° C.

[b] Under the same conditions, i.e., with a 100% hemihydrate slurry and with the phosphoric acid contained therein in a concentration of 45% $P_2O_5$, such slurry was incrementally cooled, and the temperature at which the gypsum was formed was less than 85° C.

[c] At 50% $P_2O_5$, the gypsum formation temperature was less than 80° C.

It is thus seen that, in the case of conducting the final stage of the process according to the invention, the hydrate already formed has an extended range of stability, which specifically makes it possible to maintain a lower temperature during the production of the hemihydrate. Lower temperatures offer the advantages already outlined herein, particularly in relation to limiting corrosion, especially at higher concentrations.

The expansion of the range of stability also explains the improved crystallization, due to a priming effect.

EXAMPLE 3

In a series of experiments conducted as in Example 1, the initial character of ground Togo phosphate, which created problems interfering with the attainment of the calculated results, was studied:

It was observed that the attack reaction was retarded, or even completely blocked, by an excess of $SO_4^{--}$ ions. The acceptable maxima of the $SO_4^{--}$ ions were determined; same must not exceed 2 g/l. A deficiency in $SO_4^{--}$ ions effected an appreciable increase in co-crystallized $P_2O_5$ which reduced the yield. Further, a stable and well crystallized hemihydrate was formed only within narrow limits of concentration and temperature. These were even narrower when the concentration of the phosphoric acid produced was higher.

TABLE I

| $P_2O_5$ | PROPORTION OF $SO_4^{--}$ in g/l | | TEMPERATURE OF THE ATTACK REACTION | TEMPERATURE OF FILTERING |
| --- | --- | --- | --- | --- |
| | MIN. | MAX. | | |
| 40 | 5 | 20 | 100° C. | 65° C. |
| 45 | 5 | 16 | 95° C. | 60° C. |
| 50 | 5 | 14 | 90° C. | 70° C. |
| 55 | 5 | 12 | 85° C. | 80° C. |

In each experiment, the hemihydrate slurry obtained was filtered, following preliminary cooling by evaporation. It was found that the hemihydrate was stable enough to be transferred and washed without hydration, if the cooling was to those temperatures shown in Table I. This provided the advantage of ability to perform the filtration without incrustation and without causing corrosion at elevated temperatures.

EXAMPLE 4

The phosphate treated was Morocco phosphate comprising 75% of tricalcium phosphate, and the sulfuric acid employed was 98% $H_2SO_4$.

The phosphate was completely introduced at the level of the central agitator of a vessel equipped with but single agitator.

The sulfuric acid was introduced in admixture with the acid recycled from the hemihydrate slurry resulting from this attack of the plug toward the vessel of attack reaction.

In this washing installation, the hemihydrate cake was washed by means of two successive, systematic washes with a liquid from a second stage of the process, the second stage consisting of recrystallizing the hemihydrate to gypsum and reflecting the advantages, on the one hand, of recovering the $P_2O_5$ retained in the hemihydrate in the co-crystalline form, and, on the other hand, of recovering the major amount of the $P_2O_5$ which had not been attacked during the course of the phosphate attack reaction, in the form of the hemihydrate.

The direct attack on the phosphate in a single stage results in a slurry having filtration properties sufficiently high to produce an acid with a concentration of 50% $P_2O_5$ or even greater amounts.

The yield of the attack reaction on the phosphate is a function of the operating rate of the apparatus, the origin of the phosphate and its degree of fineness. With 75% BPL Morocco phosphate the yield in $P_2O_5$ of the attack which produced an acid comprising 50% $P_2O_5$ was comparable to the yield obtained by a process of conventional type, which produced an acid comprising 30% $P_2O_5$ for the same grade of phosphate.

EXAMPLE 5

Into the vortex generated by the central agitator of a non-compartmented cylindrical vessel having a capacity of 50 m³, 12 tons per hour of ground Togo phosphate comprising 38.3% $P_2O_5$ were continuously introduced, together with 9.4 tons per hour of sulfuric acid (98% $H_2SO_4$) premixed with approximately 15 m³ phosphoric acid, recycled from the filter, and which displayed the following approximate titer: 500 g/l $P_2O_5$ and 70 g/l $H_2SO_4$. The temperature was maintained at 90° C. and the free calcium sulfate was 100% crystallized in the form of the semihydrate.

The slurry, cooled to 70° C. by means of vaporization, was transported to a continuous vacuum band filter having an effective surface of 12 m²; the filter cake was washed with approximately 12 m³ per hour of an acid having the approximate titer of 150 g/l $P_2O_5$ and 180 g/l $H_2SO_4$. The entire phosphoric acid production, amounting to more than 9 tons per hour of an acid titrating 48% $P_2O_5$ and 0.6% $H_2SO_4$, was extracted by the filter, except that the head fractions, the excess strong acid and the wash acid, were recycled to the attack reaction zone.

The filter cake, yielding approximately, per hour: 17 tons of semihydrate base solids, 6 tons water, 1.8 tons $P_2O_5$, of which 0.25% was co-crystallized or unreacted, and 1.2 tons of $H_2SO_4$ was introduced into an agitated vessel having a capacity of 80 m³, into which were introduced, simultaneously, 1 ton per hour of 98% sulfuric acid premixed with approximately 14 m³ of an acid with the approximate titer of 100 g/l $P_2O_5$ and 125 g/l $H_2SO_4$, and recycled from the gypsum filtration step. The temperature was maintained at 60° C. and the calcium sulfate was entirely in the form of gypsum.

The slurry was transported to a continuous vacuum filter, such as that described in French Pat. No. 1,327,693 and having an effective surface of 7 m²; the filter cake was systematically washed with a weak recirculated acid and then with water. Strong acid was used in part to wash the semihydrate filter cake, the excess and the acid of intermediate strength were returned to the hydration vessel. The washed gypsum contained less than 0.2% $P_2O_5$ and less than 0.1% fluorine.

EXAMPLE 6

For purposes of comparison, experiments were performed on gypsums originating from different phosphates, i.e., 78% Togo and 75% Morocco. The attack reactions were conducted by the conventional gypsum process in Tests a and c and by the process of the invention, consistent with the embodiment of rehydration of the hemihydrate in the Tests b and d, under the following conditions: attack temperature was 100° C.; phosphoric acid was produced with a content of $P_2O_5$ of 50%.

The hemihydrate was rehydrated to gypsum at 60° C. in a medium containing 100 g/l $H_2SO_4$ in the form of phosphoric acid; respective retention times were 4 and 2 hours.

TABLE II

| ORIGIN OF THE GYPSUM | | MORPHOLOGY | COLOR | UNREACTED $P_2O_5$ % | SOLUBLE $P_2O_5$ % | CO-CRYSTALLIZED $P_2O_5$ % |
|---|---|---|---|---|---|---|
| Togo 78% | a | Pseudo-Spherical agglomerates | Chamois (buff) clear | 0.46 | 0.200 | 0.52 |
| | b | Flat crystals | White | 0.09 | 0.009 | 0.03 |
| Morocco 75% | c | Flat crystals | Gray-white | 0.60 | 0.1500 | 0.4 |
| | d | Flat crystals | White | 0.07 | 0.012 | 0.02 |

EXAMPLE 7

The conditions of the known processes of the prior art were reproduced, said processes requiring a two-stage phosphate attack reaction, first with a deficiency and secondly with an excess of sulfuric acid, effecting the formation of the hemihydrate form a reaction medium consisting in large part of monocalcium phosphate.

A phosphoric acid having a $P_2O_5$ content of 45% was prepared from ground Togo phosphate, in two vessels (1) and (2), with respective retention times of 4 and 2 hours at 100° C., with a proportion of solids of 32%, with an additional 1 hour at 75° C. in a prefiltration vessel. In Test (a), all of the $H_2SO_4$ with a minimum content of 20 g/l without recycling, was introduced in (2); in (b) the $H_2SO_4$ content was lowered to 12-15 g/l, in (c) the vessel (2) was recycled five times per hour in the vessel (1); in (d) $H_2SO_4$ was recycled and introduced in vessel (1), i.e., 25% in $d_1$, 50% in $d_2$, 75% in $d_3$, 100% in $d_4$ [Test $d_4$ reflects the conditions of the invention].

It was found that Test (a) resulted in an unstable operation and in blockage of the attack reaction. Test results are compiled as follows:

TABLE III

| | b | c | $d_1$ | $d_2$ | $d_3$ | $d_4$ |
|---|---|---|---|---|---|---|
| Yield of attack reaction | 91.5 | 94.9 | 95.7 | 96.1 | 96.2 | 96.7 |
| Loss in co-crystallized $P_2O_5$ | 4.5 | 3.1 | 3.0 | 2.7 | 2.5 | 2.4 |
| Loss in unreacted $P_2O_5$ | 4.0 | 2.0 | 1.3 | 1.2 | 1.3 | 0.9 |
| Filtering capacity, in kg $P_2O_5/m_2/h$ | 14.5 | 300 | 415 | 435 | 445 | 450 |
| Yield upon washing | 97.5 | 98 | 98.6 | 98.7 | 98.9 | 98.9 |

It will thus be seen that the yield of the attack reaction increases at the rate at which the conditions of the process approach those within the ambit of the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the direct production of concentrated phosphoric acid and calcium sulfate hemihydrate by sulfuric acid attack upon calcium phosphate, the improvements comprising (i) continuously conducting the acid attack reaction, with concomitant formation of crystalline calcium sulfate hemihydrate, in but a single, homogeneous liquid reaction medium comprising the products of reaction, (ii) maintaining constant the temperature of the reaction medium as to effect formation of hemihydrated calcium sulfate, (iii) controlling the amount of reactants introduced to the reaction such as to maintain essentially constant, in liquid phase, a solids content of between 25 and 50% by weight and a determined sulfate ion content ranging from 5 g/l to 20 g/l with said determined sulfate ion content being inversely proportional for a given temperature with the $P_2O_5$ concentration which ranges between 55% and 40% by weight, such that said determined sulfate ion content ranges from 5 g/l to 20 g/l for a $P_2O_5$ concentration of about 40% with the temperature of the reaction medium being about 100° C., from about 5 g/l to 16 g/l for a $P_2O_5$ concentration of about 45% with the temperature of the reaction medium being about 95° C., from about 5 g/l to about 14 g/l for a $P_2O_5$ concentration of about 50% with the temperature of the reaction medium being about 90° C., and from 5 g/l to 12 g/l for a $P_2O_5$ concentration of about 55% with the temperature of the reaction medium being about 85° C., and (iv) withdrawing a fraction of reaction effluent, including the concentrated phosphoric acid, and individually separating and recovering hemihydrated calcium sulfate from said reaction effluent fraction upon cooling the effluent fraction to a temperature sufficient to insure yielding a hemihydrate stable enough to be transferred and washed without hydration.

2. The process as defined by claim 1, further comprising washing said separated hemihydrated calcium sulfate with water, the wash water being recycled to the reaction medium for phosphate attack purposes.

3. The process as defined by claim 1, wherein the temperature of the reaction medium is maintained at a value between 80° C. and 100° C. for a $P_2O_5$ concentration between 55% and 40% by weight in liquid phase.

4. The process as defined by claim 1, wherein the separation is by means of a filter, the solids being washed systematically, said washing being with water, recycling each liquid to the filter and recycling wash liquid to the reaction medium.

5. The process as defined by claim 1, wherein the phosphate attack reaction is conducted in a non-compartmented reaction zone, said reaction zone being equipped with vigorous agitation means.

6. The process as defined by claim 1, further comprising continuously transferring the hemihydrated calcium sulfate to a second zone, under agitation, and rehydrating same to gypsum in the presence of a reaction medium containing the products of rehydration, while there maintaining a temperature effecting rehydration of hemihydrated calcium sulfate to gypsum, and while introducing sulfuric acid thereto for such time sufficient as to complete the recrystallization into gypsum, and thereafter recovering the gypsum and recycling the mother liquor to the phosphate attack reaction medium.

7. The process as defined by claim 6, wherein in the rehydration zone a temperature comprised between 40° and 100° C. is maintained.

8. The process as defined by claim 6, wherein in the rehydration zone a temperature comprised between 50° C. and 80° C. is maintained.

9. The process as defined by claim 6, wherein the introduction of sulfuric acid is controlled so that a $SO_4^{--}$ ion content between 50 g/l and 300 g/l is maintained in the liquid phase.

10. The process as defined by claim 6, wherein the $P_2O_5$ concentration in the liquid phase is less than 25%.

11. The process as defined by claim 6, wherein the separated gypsum is systematically washed with water, the most concentrated liquid obtained returned to the hemihydrate wash zone, a liquid of intermediate concentration returned to the rehydration zone and a least concentrated liquid returned to the initial gypsum wash.

12. The process as defined by claim 6, wherein the duration of the attack reaction is controlled between one and eight hours and the duration of the recrystallization to gypsum between 30 minutes and six hours.

13. The process as defined by claim 12, wherein the duration of the attack reaction is controlled between 3 and 4 hours and the duration of the recrystallization to gypsum between 1 and 2 hours.

14. The process as defined by claim 1, wherein the sulfate ion content ranges from 5 g/l to 20 g/l, the $P_2O_5$ concentration is about 40%, and the temperature of the reaction medium is about 100° C.

15. The process as defined by claim 1, wherein the sulfate ion content ranges from 5 g/l to 16 g/l, the $P_2O_5$ concentration is about 45%, and the temperature of the reaction medium is about 95%C.

16. The process as defined by claim 1, wherein the sulfate ion content ranges from 5 g/l to 14 g/l, the $P_2O_5$ concentration is about 50%, and the temperature of the reaction medium is about 90° C.

17. The processss as defined by claim 1, wherein the sulfate ion content ranges from 5 g/l to 12 g/l, the $P_2O_5$ concentration is about 55%, and the temperature of the reaction medium is about 85° C.

18. The process as defined in claim 14, wherein the effluent fraction is cooled to about 65° C. prior to separating and recovering the hemihydrated calcium sulfate therefrom.

19. The process as defined in claim 15, wherein the effluent fraction is cooled to about 60° C. prior to separating and recovering the hemihydrated calcium sulfate therefrom.

20. The process as defined in claim 16, wherein the effluent fraction is cooled to about 70° C. prior to separating and recovering the hemihydrated calcium sulfate therefrom.

21. The process as defined in claim 17, wherein the effluent fraction is cooled to about 80° C. prior to separating and recovering the hemihydrated calcium sulfate therefrom.

* * * * *